June 24, 1930.  J. LEDWINKA  1,767,464
SILL CONSTRUCTION
Filed Dec. 21, 1926

INVENTOR:
Joseph Ledwinka,
BY John P. Sarbox
ATTORNEY.

Patented June 24, 1930

1,767,464

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

SILL CONSTRUCTION

Application filed December 21, 1926. Serial No. 156,082.

This invention relates to a sill construction for automobile bodies, particularly those bodies constructed of pressed metal, although it is perfectly apparent, that it could be used advantageously upon composite or other types of bodies.

In the construction of automobile bodies, particularly those formed of pressed metal, the parts or elements of the structure are designed with a view to the ease with which they may be manufactured, the facility with which they may be assembled and secured together, the obtainance of a maximum strength for a minimum weight, and the final appearance of the completed body. Especially does the design of the body side sill require a careful consideration of these advantages since this element is that upon which the body is built up and is generally of considerable size, wherefore, its production by stamping operations is rendered difficult.

The object of this invention is to provide a sill constructed of pressed metal for automobile bodies which is readily and inexpensively manufactured by stamping operations, easily assembled into the body, and possesses great strength without excessive weight.

Other objects and advantages will become apparent from time to time during the description.

Figure 1:
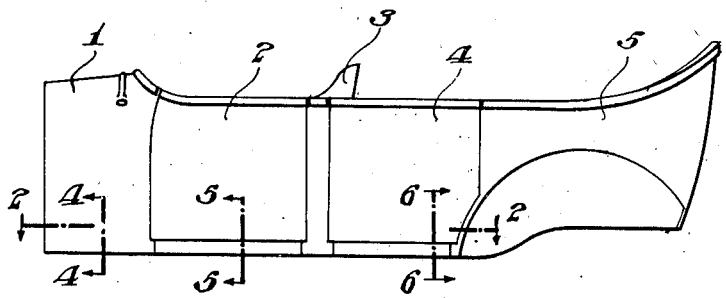
Figure 2:
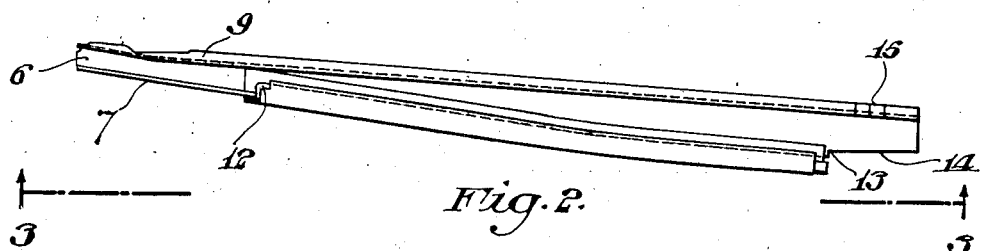
Figure 3:
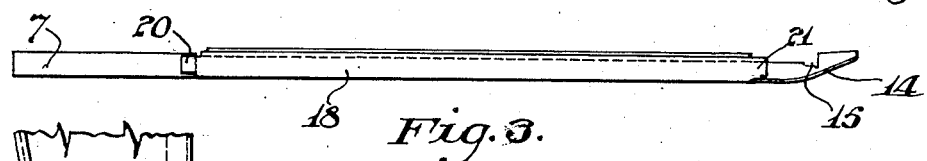
Figure 5:
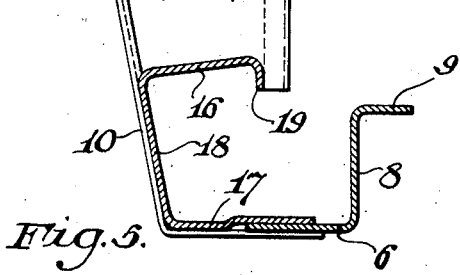
Figure 4:
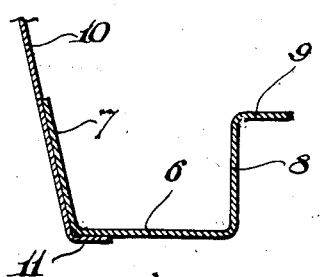
Figure 6:
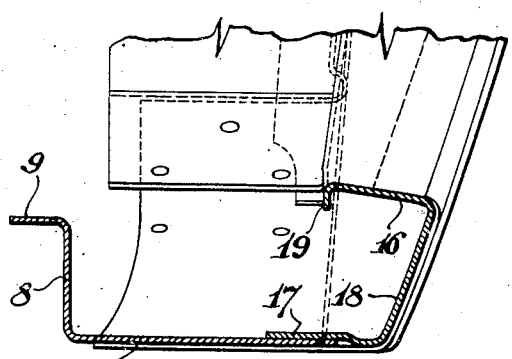

An embodiment which the invention may take is shown in the accompanying drawing wherein, Fig. 1 is a side elevational view of an automobile body using a sill formed in accordance with the invention, Fig. 2 is a top plan view of the sill, taken from the line 2—2 of Fig. 1, Fig. 3 is a side elevational view of the sill shown in Fig. 2; taken from the line 3—3 of said figure, Fig. 4 is a vertical transverse section on line 4—4 of Fig. 1, Fig. 5 is a vertical transverse section on line 5—5 of Fig. 1, and Fig. 6 is a transverse vertical section on line 6—6 of Fig. 1.

The sill is shown herein as forming a part of the structure of a touring car body, but it should be appreciated that it could be used equally as well in other types of bodies, either open or closed.

The body shown in Fig. 1, comprises a cowl unit 1, front door 2, front seat unit 3, rear or tonneau door 4, and a tonneau unit 5. The arrangement of the vertical posts of the frame is well understood; the post at the rear of the cowl to which the front door is hinged being the A post, that between the front and rear doors being the B—C post, and that at the rear door to which the latter is hinged being the D post. The manner in which these posts are attached to the sill does not form a part of this application, so will not be described in detail. The body paneling, likewise, is not a part of the subject matter covered by this application and the description thereof, or reference thereto, will only be to the extent that such paneling relates to the sill construction.

The sill used in the embodiment of the invention is an integral stamping of sheet metal. The forward portion of the sill beyond the A post is an upwardly presenting flanged channel member having a base 6, an outer arm 7, and an inner arm 8. The outer arm is inclined outwardly while the inner arm, of shorter vertical height than the outer, has a flange 9 projecting inwardly of the body. The cowl paneling 10 lies against the outer arm 7 and is flanged at 11 so as to lie against and beneath the base 6. The paneling 10 is preferably welded to the channel.

At approximately the point of the A post's securement to the sill the outer arm 7 terminates and the base 6 is cut away inwardly, as indicated at 12. This cut away portion extends rearwardly in a slightly outwardly increasing curve to the point 13 just in advance of the D post. The outer side of the remainder of the sill is again inwardly cut away as indicated at 14. The flange 9 on the inner arm extends the full length of the sill except at the point 15, where tabs are cut therefrom to form a part of the securing means for the D post. The base of the sill is upwardly offset at its rear end starting approximately on a line through the tabs 15.

In order to provide a threshold and finish strip along the sill at the doorway, a separate member is secured thereto. This member comprises in the main an inwardly facing channel member having inwardly extending arms 16 and 17 and a connecting portion 18 therebetween. The arm 16 is inclined upwardly and has a downturned flange 19 at its inner end which cooperates with the flange 9 of the sill to form a support for the floor boards of the body. The connecting portion 18 is inclined outwardly and is of greater height than the arm 8 of the sill. The arm 17 is upwardly deflected intermediate its ends a distance substantially equal to the thickness of the base 6 of the sill. The arm 16 is cut away at each of its ends a short distance so that the portion 18 will extend therebeyond and form lugs 20 and 21. The end of the threshold member at which the lug 20 is located is provided with a slot between the lug and the arm 17 of a length substantially equal to that of the lug.

The threshold member is applied to the sill at the inwardly cut away portion, the arm 17 overlapping the base 6 of the sill and being preferably welded thereto, although it may be riveted or otherwise secured. The overlap between the arm and the sill follows the curve of the cutaway portion and because of the upward deflection of the arm 17 the two members thus secured together present a plane under surface. The lug 20 extends along the outside of the outer arm 7, while, due to the slot between the lug and the arm 17, the latter is nested in the sill between arms 7 and 8.

The connecting portion 18 of the threshold member constitutes the finish strip for the body below the door openings while the arm 16 thereof forms a threshold for the door openings.

The sill is readily formed by stamping operations being an integral piece of simple configuration. In like manner the threshold member lends itself to stamping very readily being of an easily handled size and not having any difficult flanges or curves. The two members are so arranged as to permit of assembly and connection in a facile manner, such joindure presenting a strong serviceable connection. While the sill and threshold member after assembly constitute in effect an integral member, it is quite apparent that a single member possessing the same configuration would be practically impossible of production by stamping operations. The manner in which the cut away portion of the sill is curved and the threshold member secured thereto takes care of the contour of the finished body, and the upwardly deflected portion of the sill base provides for the rear wheel housing. Another, and most important factor is that the sill thus constructed adapts itself admirably for the application of the paneling thereto.

The foregoing description has shown that a construction embodying the invention fully and adequately attains the objects desired, so accordingly, the following claims are herewith appended with the understanding that the various adaptations and modifications which such invention may take are only to be limited by the scope of said claims.

What I claim is:—

1. In an automobile body construction, a main body side sill a part of which is an angle and another part of which is an upwardly presenting channel, and a separate member in the form of an inwardly presenting channel having its lower arm overlapping and secured to the base of the angle of the sill and its vertical arm in longitudinal continuation of the outer arm of the channel part of the sill, the upper arm of the separate member forming a threshold.

2. In an automobile body construction, a main body side sill upwardly deflected adjacent one end and having an upwardly presenting channel adjacent the other end, and an inwardly presenting channel member secured to said sill intermediate the upwardly deflected and channeled portions thereof with its vertical arm in longitudinal continuation of the outer arm of the channeled portion.

3. In an automobile body construction, a main body side sill comprising an upwardly presenting channel throughout the major portion of its length, the outer arm of said channel being formed of separate elements one of which is in longitudinal continuation of the other and has an inwardly extending flange forming a threshold, the parts being secured together to form an integral sill structure.

4. In an automobile body construction, a main body side sill comprising an upwardly presenting channel the inner arm of which is substantially straight while the outer arm is curved, said outer arm being cutaway to permit a threshold member to be secured to said sill, said threshold member having an arm thereof in longitudinal continuation of the outer arm of the sill and secured thereto to form an integral part of the sill structure.

5. In an automobile body construction, an upwardly presenting channel member forming a body sill having its outer arm extending rearwardly a part of the longitudinal length of the sill and its base inwardly cutaway adjacent the end of the outer arm, and an inwardly presenting channel member having its lower arm overlapping and secured to the base of the sill at the cutaway portion thereof and its vertical arm forming a continuation of the outer arm of the sill.

In testimony whereof he hereunto affixes his signature.

JOSEPH LEDWINKA.